(12) United States Patent
Martinez et al.

(10) Patent No.: US 11,958,442 B2
(45) Date of Patent: Apr. 16, 2024

(54) VEHICLE ROOF RACK MOUNTING BRACKET SYSTEM

(71) Applicant: NAADE, Inc., Brea, CA (US)

(72) Inventors: Manuel Alvarez Martinez, Brea, CA (US); Abraham Ramirez Moreno, Brea, CA (US)

(73) Assignee: NAADE, Inc., Brea, CA (US)

( * ) Notice: Subject to any disclaimer, the term of this patent is extended or adjusted under 35 U.S.C. 154(b) by 393 days.

(21) Appl. No.: 17/479,973

(22) Filed: Sep. 20, 2021

(65) Prior Publication Data
US 2023/0027504 A1    Jan. 26, 2023

Related U.S. Application Data

(60) Provisional application No. 63/223,812, filed on Jul. 20, 2021.

(51) Int. Cl.
*B60R 9/058* (2006.01)
*B62D 25/07* (2006.01)

(52) U.S. Cl.
CPC ............. *B60R 9/058* (2013.01); *B62D 25/07* (2013.01)

(58) Field of Classification Search
CPC ................................ B60R 9/058; B62D 25/07
USPC ........................................................ 224/329
See application file for complete search history.

(56) References Cited

U.S. PATENT DOCUMENTS

| 2,173,172 | A | * | 9/1939 | Leinen | H02G 3/18 248/343 |
| 2,804,248 | A | * | 8/1957 | Samuels | B60R 9/058 224/329 |
| 2,807,398 | A | * | 9/1957 | Mathews | B60R 9/08 224/570 |
| 3,719,313 | A | | 3/1973 | Tischler | |
| 3,761,890 | A | | 9/1973 | Fritts et al. | |
| D244,268 | S | | 5/1977 | Hinch | |
| 4,152,020 | A | | 5/1979 | Brown et al. | |
| D253,170 | S | | 10/1979 | Ramirez | |
| 4,211,448 | A | | 7/1980 | Weston | |
| 4,267,948 | A | | 5/1981 | Lewis | |
| 4,278,175 | A | | 7/1981 | Jackson | |
| 4,432,479 | A | | 2/1984 | Graber | |
| 4,473,868 | A | | 9/1984 | Moore | |
| 4,489,868 | A | | 12/1984 | Thirion | |

(Continued)

OTHER PUBLICATIONS

ADD Addictive Desert Designs, 2017—Current Ford Raptor Race Series R Chase Rack Installation Instructions, Sep. 27, 2018, 1 page.

(Continued)

*Primary Examiner* — Peter N Helvey
(74) *Attorney, Agent, or Firm* — Stetina Brunda Garred & Brucker

(57) ABSTRACT

A mounting bracket system for a vehicle roof, and a method for its attachment to a vehicle having a side rail including a drip well, is contemplated in which no drilling of holes or other permanent modifications to the vehicle roof is required, and in which each individual mounting bracket may be independently fixed in place without requiring any structural support from interconnections with any other mounting bracket via crossbars or other interconnections. In this regard, a number of problems associated with prior mounting bracket systems may be overcome.

20 Claims, 4 Drawing Sheets

(56) References Cited

U.S. PATENT DOCUMENTS

| | | | |
|---|---|---|---|
| 4,569,002 A | 2/1986 | English et al. | |
| 4,583,152 A | 4/1986 | Kawai et al. | |
| 4,659,131 A | 4/1987 | Flournoy | |
| 4,707,014 A | 11/1987 | Rich | |
| 4,721,239 A * | 1/1988 | Gibbs, III | B60R 9/058 224/558 |
| D295,084 S | 4/1988 | Weber | |
| 4,787,665 A | 11/1988 | Rich | |
| 4,854,628 A | 8/1989 | Halberg | |
| D305,111 S | 12/1989 | Zagner | |
| D306,848 S | 3/1990 | Macor | |
| 5,002,324 A | 3/1991 | Griffin | |
| D316,391 S | 4/1991 | Lund | |
| D318,447 S | 7/1991 | Haugen et al. | |
| 5,037,152 A | 8/1991 | Hendricks | |
| 5,061,000 A | 10/1991 | Haugen et al. | |
| 5,143,415 A | 9/1992 | Boudah | |
| 5,152,570 A | 10/1992 | Hood | |
| 5,192,107 A | 3/1993 | Smith, Sr. | |
| 5,303,858 A | 4/1994 | Price | |
| 5,316,190 A | 5/1994 | Bullock | |
| D360,614 S | 7/1995 | Alcocer | |
| D363,460 S | 10/1995 | Marshall | |
| 5,464,140 A | 11/1995 | Hill | |
| 5,476,301 A | 12/1995 | Berkich | |
| 5,492,259 A | 2/1996 | Tippets | |
| D367,843 S | 3/1996 | Tayar | |
| 5,560,666 A | 10/1996 | Vieira et al. | |
| 5,692,791 A | 12/1997 | Sulzer | |
| D394,639 S | 5/1998 | Carter | |
| 5,752,734 A | 5/1998 | Ward et al. | |
| 5,806,905 A | 9/1998 | Moore | |
| D399,476 S | 10/1998 | Duncan | |
| 5,829,654 A | 11/1998 | Weger et al. | |
| 5,836,635 A | 11/1998 | Dorman | |
| 6,131,781 A | 10/2000 | Murray | |
| D436,915 S | 1/2001 | Burger | |
| D444,446 S | 7/2001 | Carter | |
| 6,264,082 B1 * | 7/2001 | Lindell | B60R 9/058 224/322 |
| 6,367,673 B1 | 4/2002 | Smith et al. | |
| 6,394,524 B1 | 5/2002 | Morse | |
| D463,358 S | 9/2002 | Thomas | |
| D467,862 S | 12/2002 | Jenkins | |
| 6,513,849 B2 | 2/2003 | Carter | |
| 6,520,723 B2 | 2/2003 | Christensen | |
| D493,414 S | 7/2004 | Condos et al. | |
| D494,921 S | 8/2004 | Taylor | |
| 6,883,848 B1 | 4/2005 | Iverson et al. | |
| 6,983,968 B2 | 1/2006 | Brauer et al. | |
| 6,983,977 B1 | 1/2006 | Kozak et al. | |
| D515,495 S | 2/2006 | Storer | |
| D528,964 S | 9/2006 | Storer et al. | |
| D528,968 S | 9/2006 | Storer et al. | |
| 8,245,460 B2 * | 8/2012 | Yamanaka | F24S 25/30 52/173.3 |
| 8,424,255 B2 | 4/2013 | Lenox et al. | |
| 8,511,009 B2 | 8/2013 | Kobayashi et al. | |
| 8,763,978 B2 | 7/2014 | Newman et al. | |
| 10,189,395 B2 | 1/2019 | Wymore | |
| 10,207,649 B2 * | 2/2019 | Wymore | B60R 9/042 |
| 10,821,874 B2 | 11/2020 | Wymore | |
| 2014/0109496 A1 | 4/2014 | Stapleton | |
| 2015/0217679 A1 | 8/2015 | Paine et al. | |
| 2015/0310781 A1 | 10/2015 | Fisher | |
| 2019/0061599 A1 | 2/2019 | Wymore | |

OTHER PUBLICATIONS

Addictive Desert Designs, 2017-ford-raptor-chase-racktg, Sep. 27, 2018, 1 page.

Patent Cooperation Treaty, International Search Report and Written Opinion for International Application No. PCT/US2017/043134, dated Oct. 2, 2017, 10 pages.

Addictive Desert Designs ADD Offroad, web page, Sep. 27, 2018, 8 pages.

Addictive Desert Designs, ford-f150-chase-rack.jpg, Sep. 27, 2018, 1 page.

* cited by examiner

VEHICLE ROOF RACK MOUNTING BRACKET SYSTEM

CROSS-REFERENCE TO RELATED APPLICATIONS

This application claims the benefit of U.S. Provisional Application No. 63/223,812, filed Jul. 20, 2021, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to the field of vehicle roof mounting systems. More particularly, the present disclosure relates to novel systems and methods for attaching and one or more mounting bracket systems to a vehicle roof without requiring any drilling or other permanent modification of the vehicle, or which necessitate the interconnections between multiple brackets.

2. Related Art

In the field of vehicle roof mounting systems, there is a strong demand for improved products that are capable of better addressing customer needs. Technology must develop the support this demand.

Currently, vehicle roof mounting systems suffer from a number of deficiencies. Today, the predominant way in which roof mounting systems are securely fixed to a vehicle roof is via permanent and irreversible modifications to the roof itself, such as drilling of holes at specified locations on the roof followed by fastening the roof mounting system to the roof via such holes. The downsides of such systems are obvious—not only is physical modification of the vehicle roof itself a laborious process that requires external equipment, but such modifications may hinder or destroy the functionality of the vehicle if the presence roof mounting system is no longer desired. If a user becomes dissatisfied satisfied with the roof rack, and/or wishes to remove the roof rack even temporarily, they must conceive of a further method to cover or otherwise close the holes which were drilled, or risk exposing the inside of the vehicle to the elements.

Even in roof systems which do not require permanent modifications to be made to the vehicle, i.e. drilling, such systems are not entirely satisfactory. For example, there are known systems which do not rely on the drilling of holes for mounting of roof racks, but rather rely on the presence of structural elements which connect together multiple mounting elements in order to securely fix such mounting elements on the roof of the vehicle. These systems, however, are difficult to install, are often proprietary to specific roof installations, add unnecessary height to the ultimate structure that the vehicle owner wishes to mount on the roof of their vehicle, and lack flexibility in that they require installation of at least two, and in some cases a minimum of four mounts at different locations in order for any one of the mounts to remain fixed. Generally, these systems require a horizontal crossbar running from one side of the roof to the other. If the vehicle owner only wishes to have a single mount at a single mounting location, or to have different arrangement of mounts for mounting different types of roof fixtures, these mounting systems are unsuitable.

Therefore, this is a need in the art for improved vehicle roof mounting systems and method of installing such improved vehicle roof mounting systems, which remedy these deficiencies.

BRIEF SUMMARY

A mounting bracket system for a vehicle roof having a side rail including a drip well is contemplated in which no drilling of holes or other permanent modifications to the vehicle roof is required, and in which each individual mounting bracket may be independently fixed in place without requiring any structural support from any crossbars or other interconnections with another mounting bracket. In this regard, a number of problems associated with prior mounting bracket systems may be overcome.

According to one exemplary embodiment, a mounting bracket system for a vehicle roof having a side rail including a drip well and a peripheral edge region having an upper side and a lower side, is contemplated, the mounting bracket system comprising a roof rail bracket, the roof rail bracket comprising a hook portion and a flange portion, the hook portion being configured to engage with the side rail via the hook portion extending downward around the peripheral edge region from the upper side to the lower side, the flange portion defining a lower flange aperture and including an upper flange connector, the mounting bracket system additionally comprising a drip well bracket, the drip well bracket comprising a drip well portion and a mounting portion, the drip well portion defining a lower drip well aperture and comprising an upper drip well fastener configured to engage with the upper flange connector as well as a drip well occlusion region configured for insertion within the drip well, the drip well occlusion region having a thickness sufficient to substantially occupy the majority of a width of the drip well, the drip well portion being configured for engagement with the drip well via insertion of the drip well occlusion region into the drip well, the mounting bracket system additionally comprising a lower aperture fastener, wherein when the hook portion is engaged with the side rail, the drip well portion is engaged with the drip will, and the upper drip well fastener is engaged with the upper flange connector, the lower flange aperture and the lower drip well aperture are configured to be in substantial alignment so as to permit the placement of a lower aperture fastener therethrough, the lower aperture fastener being operative to tension the roof rail bracket against the drip well bracket so as to fix the mounting bracket system to the side rail.

The mounting bracket system may be configured such that the flange portion extends substantially vertically upward when the hook portion is engaged with the side rail, and/or such that the drip well portion is configured to extend substantially vertically upward when the drip well portion is engaged with the drip well.

The mounting bracket system may be configured such that the flange portion comprises an outer side and an inner side, and wherein the drip well bracket further comprises a protruding tensioning surface, such that when the upper drip well fastener is engaged with the upper flange connector and when the lower aperture fastener tensions the roof rail bracket against the drip well bracket, the inner side of the flange contacts against the protruding tensioning surface. Such embodiments may be further configured such the upper drip well fastener comprises a clasp and the upper flange connector defines an upper flange aperture sized and configured for receiving the clasp therethrough, such that when the upper drip well fastener is engaged with the upper flange connector, the clasp protrudes through the upper flange aperture and contacts against the outer side of the flange when the lower aperture fastener tensions the roof rail bracket against the drip well bracket and the inner side of the flange contacts against the protruding tensioning surface. The upper drip well fastener may be positioned vertically above the protruding tensioning surface. In addition, the upper drip well fastener and the tensioning surface may be formed as a unitary component for integration with the drip well bracket. Such integration may comprise temporary engagement with, or may comprise permanent engagement with, the drip well bracket.

According to additional refinements of the herein contemplated mounting bracket system, a reinforcing armature between the drip well portion and the mounting portion for providing additional structural support to the mounting portion. The upper drip well fastener, the tensioning surface, and the reinforcing armature are formed as a unitary component for integration with the drip well bracket.

According to further refinements of the herein contemplated mounting bracket system, the lower aperture fastener may comprise a threaded fastener assembly, and/or the flange portion may further comprise one or more reinforcement portions. The one or more reinforcement portions may comprise at least one reinforcement rib. Additionally, the drip well occlusion region may comprise a drip well protrusion substantially transverse to the drip well portion. The drip well protrusion may comprise a buffer portion for contacting against an internal side of the drip well, the buffer portion being formed of one or more materials having a greater elasticity or a greater plasticity than one or more of the remainder of the materials from which the drip well bracket is formed. The mounting portion of the drip well bracket may be configured to be substantially transverse to the drip well portion.

According to still further refinements of the herein contemplated mounting bracket system, the system may further comprise a cover bracket, the cover bracket comprising a horizontal cover portion and a vertical cover portion, the horizontal cover portion being configured to engage with the mounting portion of the drip well bracket, the vertical cover portion being configured such that, when the horizontal cover portion is engaged with the mounting portion, the vertical cover portion is substantially parallel with and in front of at least a portion of an outer side of the drip well portion. The vertical cover portion may further define an adjustment aperture for permitting a user to access and to adjust to the lower aperture fastener.

A method for installing a mounting bracket system for a vehicle roof having a side rail including a drip well and a peripheral edge region is also contemplated, the method comprising the steps of: (1) providing a mounting bracket system comprising (a) a roof rail bracket, the roof rail bracket comprising a hook portion and a flange portion, the hook portion being configured to engage with the side rail via the hook portion extending downward around the peripheral edge region from the upper side to the lower side, the flange portion defining a lower flange aperture and comprising an upper flange connector; (b) a drip well bracket, the drip well bracket comprising a drip well portion and a mounting portion, the drip well portion defining a lower drip well aperture and comprising an upper drip well fastener configured to engage with the upper flange connector as well as a drip well occlusion region configured for insertion within the drip well, the drip well occlusion region having a thickness sufficient to substantially occupy the majority of the width of the drip well, the drip well portion being configured for engagement with the drip well via insertion of the drip well occlusion region into the drip well; and (c) a lower aperture fastener; wherein when the hook portion is engaged with the side rail, the drip well portion is engaged with the drip will, and the upper drip well fastener is engaged with the upper flange connector, the lower flange aperture and the lower drip well aperture are configured to be in substantial alignment so as to permit the placement of a lower aperture fastener therethrough, the lower aperture fastener being operative to tension the roof rail bracket against the drip well bracket so as to fix the mounting bracket system to the side rail; (2) engaging the hook portion with the side rail; (3) engaging the drip well portion with the drip well; (4) placing the lower aperture fastener through the lower flange aperture and the lower drip well aperture; and (5) operating the lower aperture fastener in order to tension the roof rail bracket against the drip rail bracket so as to fix the mounting bracket system to the side rail.

BRIEF DESCRIPTION OF THE DRAWINGS

These and other features and advantages of the various embodiments disclosed herein are better understood with respect to the following descriptions and drawings, in which.

Common reference numerals are used throughout the drawings and the detailed description to indicate the same elements.

DETAILED DESCRIPTION

According to various aspects of the present disclosure, a mounting bracket systems and methods for installing such mounting bracket systems are contemplated, such mounting bracket systems and methods being for use with a vehicle roof having a side rail including a drip well, such systems and methods not requiring the drilling of holes or other permanent modifications to the vehicle roof, and in which each individual mounting bracket is capable of being independently fixed in place atop the vehicle room without necessitating an interconnection with another mounting bracket. As such, these systems and methods represent substantial improvements over the prior art.

Figure 1:
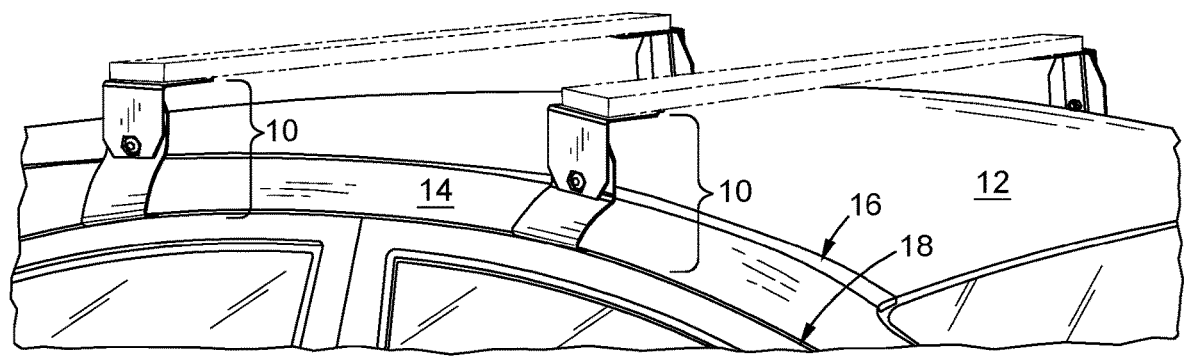
FIG. 1 is a perspective view showing an exemplary embodiment of a number of mounting bracket systems according to the presently contemplated disclosure attached to a vehicle roof.

Turning now to FIG. 1, a perspective view of a number of roof rack mounting systems 10 are shown attached to a vehicle roof 12. As may be seen, the vehicle roof 12 may include a side rail 14 and a drip well 16, with the side rail 14 having a peripheral edge region 18 which generally adjoins the vehicle door or another vehicle component. The roof rack mounting system 10 as presently contemplated is envisioned to be able to be used with any vehicle roof 12 having a side rail 14 and a drip well 16, and as such, the exact dimensions of the particular components of the roof rack mounting system 10 are not necessarily to be limited to the dimensions illustrated or discussed herein, which are to be understood as merely explanatory and illustrative. Rather, the roof rack mounting system 10 is contemplated as being usable or manufacturable so as to interface with a vehicle roof 12, which may, in some embodiment, mean that the roof rack mounting system 10 is configured with particular dimensions specific to a particular make and model of vehicle, or in other embodiments, may mean that the roof rack mounting system 10 is configured to be adaptable to be used with a wide variety of vehicle roofs 12 having a side rail 14 and a drip well 16, and it is further envisioned that "universal" configurations of roof rack mounting systems 10 may be devised according to the principles disclosed herein which may be used with most, if not all vehicles sharing a reasonably similar configuration.

The side rail 14, also occasionally called the "drip molding" may be seen to be the lateral portions of the external bodywork of the vehicle roof, and is generally delineated as the region of the vehicle roof between and inclusive of the drip well 16 and the peripheral edge region 18. In many currently manufactured vehicles, the side rail 14 is an independently formed panel that is generally attached to the remainder of the vehicle roof 12 via a weld located at the drip well 16. For this reason, the drip well 16 is also commonly referred to as the "drip weld," as it is commonly the location in which a weld seam is located between two separately manufactured components, with the weld seam being obscured from view being located within the drip well 16. It may also be common in modern production vehicles for the side rail 14 to include different color schemes or to otherwise include distinctions from the remainder of the vehicle roof 12, either for aesthetic or functional purposes.

The drip well 16, which delineates the side rail 14 from the remainder of the vehicle roof 12, is generally a depressed region which runs along each side of a vehicle roof 12 from the front to the rear of the roof, and can serve a number of functions. As previously mentioned, the drip well 16 may serve to obscure from view a weld seam which connects the bodywork of the vehicle to the roof of the vehicle. Additionally, the drip well 16 may serve to channel fluids such as rainwater which may land on the vehicle roof 12 away from the doors and windows of the vehicle. In many cases, the drip well 16 comes installed with drip well molding installed within, which may be formed of a material having qualities similar to plastic or rubber, and which may serve to protect the metal of the drip well from rusting or otherwise being damaged, to prevent water from accumulating within the drip well via better channeling fluids, and/or to enhance the aesthetics or aerodynamics of the vehicle.

The peripheral edge regions 18 of the side rails 14 may generally be seen to be positioned at the lateral sides of the side rails 14, and may be generally seen to protrude downward so as to approach the sides of the vehicle—and in many locations the vehicle doors. In order to provide better fit and finish, some vehicles may include a molding formed of a plastic or rubber-like material at this location, either positioned at the peripheral edge region 18 or at the side of the vehicle which is proximal to the peripheral edge region 18 (e.g. a door). In this respect, it may be seen that the peripheral edge region 18 may generally have an upper side and a lower side, with the upper side generally being the portion of the peripheral edge region 18 that is visible from above, and the lower side generally being the portion of the peripheral edge region 18 that is not visible from above. In some cases, the lower side of the peripheral edge region may be located at a junction that includes or may have pressed against it (i.e. when a door is closed) a seal formed of a plastic or rubberized material, which may serve, among other things, prevent the passage of water or airflow through the junction between the peripheral edge region and the side of the vehicle, which may be a door.

Figure 2:
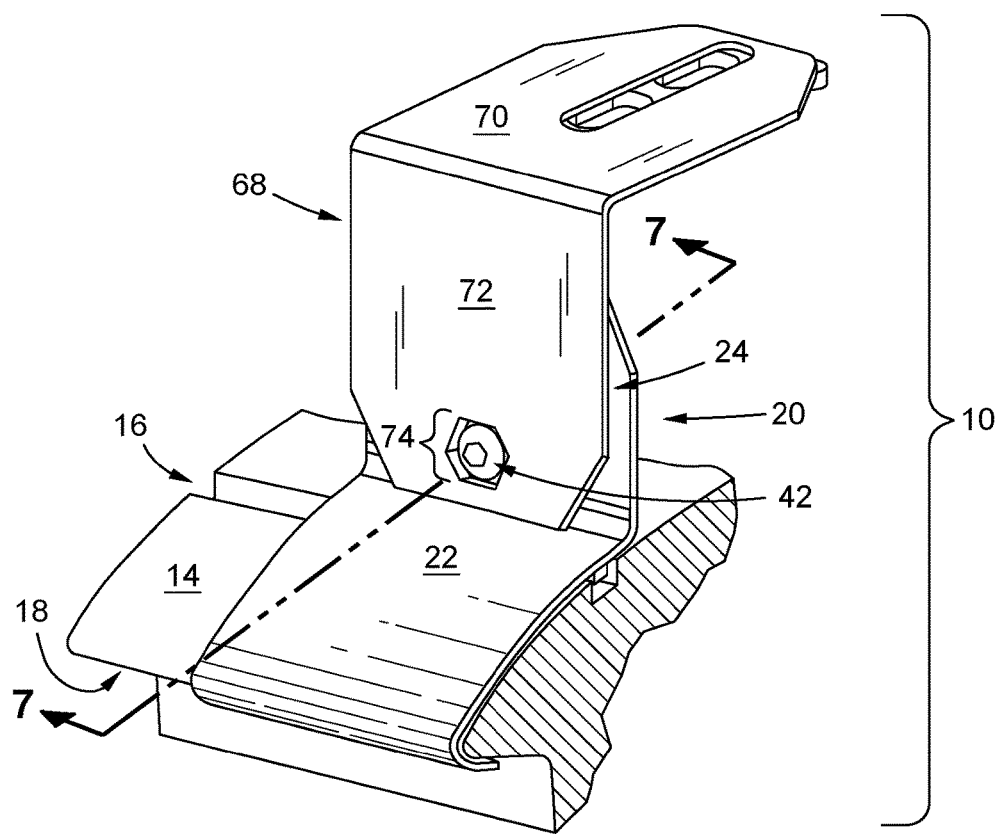
FIG. 2 is a perspective view of the exemplary embodiment of a mounting bracket system, showing in more detail how the mounting bracket system may be attached to a side rail of a vehicle roof having a drip well.

Turning now to FIG. 2, a perspective view of an exemplary mounting bracket system 10 is shown in its assembled and fixed configuration. As may be seen, the mounting bracket system 10 may comprise a roof rail bracket 20 having a hook portion 22 and a flange portion 24. The mounting bracket system 10 may also optionally include a cover bracket 68 having a horizontal cover portion 70 a vertical cover portion 72, and an adjustment aperture 74. The adjustment aperture may be seen to allow access to a lower aperture fastener 42.

Figure 3:
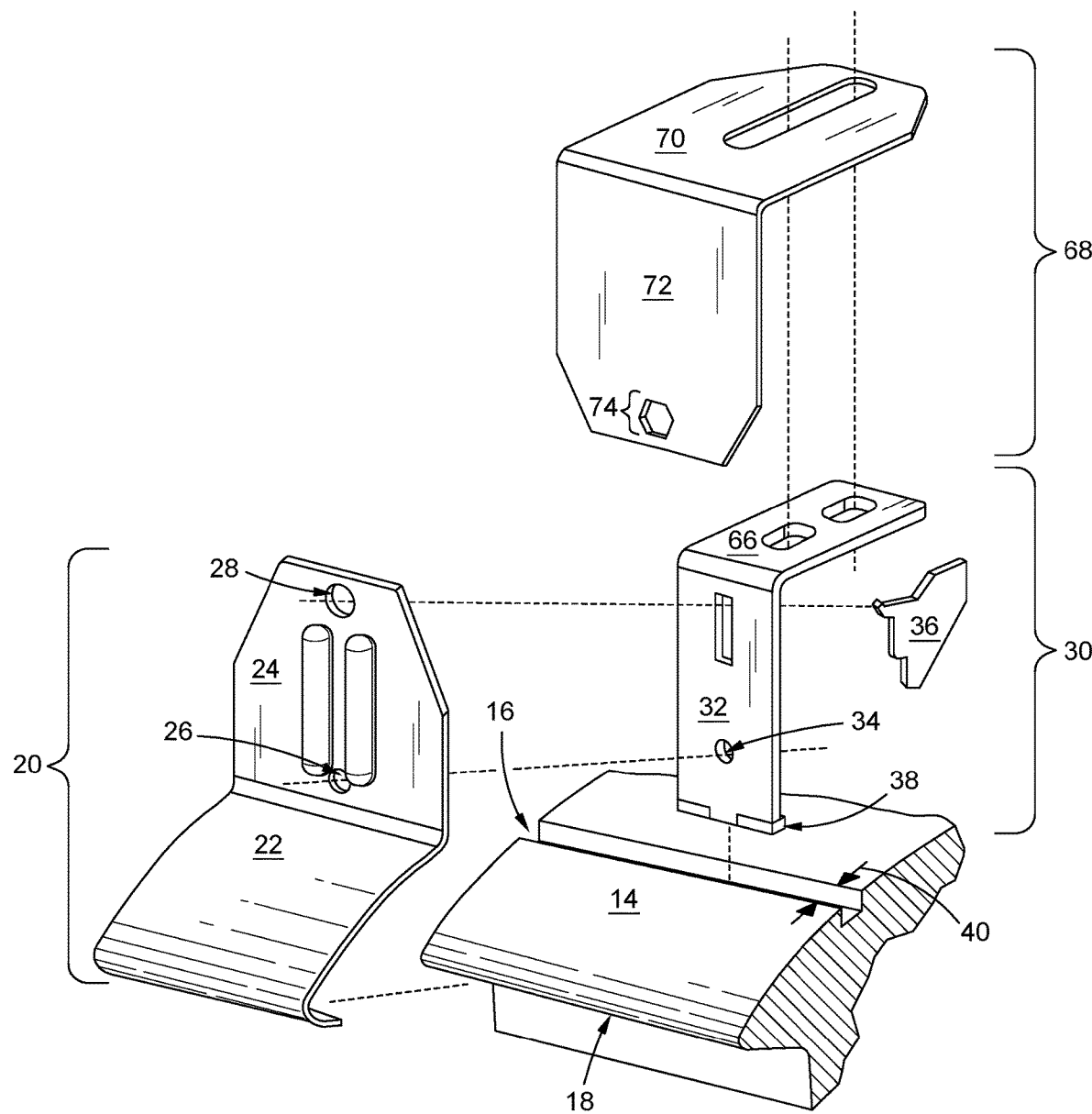
FIG. 3 is an exploded perspective view of the exemplary embodiment of the mounting bracket system shown in FIG. 2, illustrating how the various components may be attached together, including a roof rail bracket, a drip well bracket, and a cover bracket.

Turning now to FIG. 3, an exploded view of the exemplary mounting bracket system 10 shown in FIG. 2 is shown, depicting each particular component, including the roof rail bracket 20, the drip well bracket 30, and the cover bracket 68.

As may be seen, in the exemplary embodiment the roof rail bracket 20 primarily comprises a hook portion 22 and a flange portion 24. The hook portion may be configured to interface with a side rail 14 of a vehicle via the hook portion 22 generally contouring to the side rail 14 and extending around the peripheral edge region 18 from its upper side to its lower side. In this fashion, it may be seen that the hook portion, when engaged with the side rail 14, may become fixed to the side rail 14 via application of tension in a lateral direction towards the front-rear centerline of the vehicle such that the hook portion, including the curved region at the distal end, extends around the peripheral edge region 18 and contacts against it the peripheral edge region. If formed of a material which may bend or otherwise be malleable, such as a metal, it may further be seen that application of additional tension in this same direction may be seen to further cause a greater surface area of the hook portion to bend and to contour against the underlying structure of the side rail 14 including the peripheral edge region 18. As such, the application of additional tension in this regard may result in the hook portion 22 becoming progressively more engaged against the side rail 14, resulting in the mounting bracket system, when assembled, to become substantially vertically constrained via the contact of the hook portion 22 against the lower and upper sides of the peripheral edge region 18 and the other portions of the side rail 14 itself, and to be horizontally constrained in the direction in which the tension is being applied to the hook portion via the contact of the hook portion against the peripheral edge region 18. Further, the large surface area of the hook portion 22 in contact with the side rail 14 may be seen to result in a substantial frictional engagement, further fixing the hook portion 22 against the side rail and serving to prevent forward-rearward movement of the hook portion 22 relative to the location on the side rail 14 to which it is attached.

The roof rail bracket 20, in the exemplary embodiment, may further comprise a flange portion 24, which may be seen to have a lower flange aperture 26 and an upper flange aperture 28. The structure and purpose of these elements will be described in further detail in the forthcoming discussion of their relation to other components.

As may be seen, in the exemplary embodiment, the drip well bracket 30 may comprise a drip well portion 32 and a mounting portion 66. The drip well portion 32 may include a lower drip well aperture 34, an upper drip well fastener 36, and a drip well occlusion region 38. The drip well portion 32 may be seen to be, in the exemplary embodiment, to be a portion of the drip well bracket which is configured to protrude in a generally vertical upward direction when at least partially inserted within the drip well 16 of the vehicle, which may be seen to have a width 40.

Following placement of the drip well portion 42 of the drip well bracket 30 within the drip well 16 and placement of the roof rail bracket 20 with the side rail 14, The upper drip well fastener 36 may be aligned and configured to engage with the upper flange connection 28. Such alignment may then be coordinated in order to position the lower flange aperture 26 in substantial alignment with the lower drip well aperture 34, in order to permit the subsequent placement of the lower aperture fastener 42 in conjunction therewith. The lower aperture fastener 24 may thus be seen to be operative to apply tension between the roof rail bracket 20 and the drip well bracket 30. As described above, this tension may serve to engage the roof rail bracket 20 to the roof rail, and further, such tension may be seen to cause the drip rail, when inserted within the drip well 14, to have force applied against it such that the occlusion region tensions against and frictionally engaged with one or more of the sides of the drip well 16, thus serving to fix the mounting bracket system in place and constraining it in all directions, without requiring the drilling of any holes or the use of any crossbars or other external structures.

Following fixation of at least the roof rail bracket 20 and the drip well bracket 30 in the manner described above, the mounting bracket system 10 may be seen to be suitable for mounting of external structures via at least the mounting portion 66. In the exemplary embodiment, the mounting portion 66 may represent a substantially horizontal portion (when emplaced within the drip well 16) of the drip well bracket 30 which may be seen to be suitable for placement of further fastening elements, such as bolts or screws therethrough. However, it may be seen that the mounting portion 66 may be any surface or other element which may be suitable for the mounting of external structures which may be desirable to be mounted on a vehicle roof, or that the mounting portion 66 may be integrally formed with, or otherwise non-removably attached to the external structure itself, such that the drip well portion 32 of the drip well bracket 30 simply protrudes from the external structure which is desired to be mounted.

The cover bracket 68 may represent an optional element of the mounting bracket system which may serve, in the exemplary embodiment, to cover the flange portion 24 via the vertical cover portion 72 in order to, among other things, protect it from damage due to exposure to the elements or due to accidental physical contact with foreign bodies, which may be expected to occur during the process of loading or unloading heavy objects to roof racks or other systems that are attached to the vehicle roof, such as bicycles. Such damage may result in, for example, the inadvertent disengagement of the upper drip well fastener 36 with the upper flange connector 28, which may serve to harm the fixation of the mounting bracket system 10 to the roof. The cover bracket may also further incorporate design elements such as colors, designs, images, words, or logos, in order to personalize or enhance the aesthetics of the mounting bracket system. The vertical cover portion 72 may also be configured to further include an adjustment aperture 74, which may be seen to permit a user to access and adjust to the lower aperture fastener 42 without needing to remove the cover bracket. In this fashion, when a user desires to remove an external structure mounted atop the mounting bracket system 10, the mounting bracket system 10 may itself be removed from the vehicle along with the external structure via reduction of the tension of and/or removal of the lower aperture fastener 42, and thereafter remain attached to the external structure until the user desires to replace it atop the vehicle. This represents a substantial improvement over existing mounting bracket systems, which generally would not permit independent optional removal of the mounting brackets along with an external structure that is not particularly designed to be integral with the mounting brackets.

In the exemplary embodiment, the cover bracket 68 may be attached via the interposition of the horizontal cover portion 70 between the mounting portion 66 and the external structure that is mounted atop the cover bracket 68. In this way, it may further be seen that cover bracket 68 may serve as an adapter for the mounting portion 66, in that the horizontal cover portion 70 of the cover bracket 68 may be attached independently to the mounting portion 66 first through an engagement means cooperative between the cover bracket 68 and the mounting portion 66, and subsequently the cover bracket may have one or more additional engagement means which may be suitable for engagement with an external structure. In this fashion, a durable and universal drip well bracket 30 may be installed on a vehicle, and by swapping the cover bracket 68 to one that is compatible with the external structure to be mounted via including a suitable set of one or more interconnection points on the cover bracket 68, interconnection between the mounting portion 66 and the external structure may be achieved. In this fashion, the cover bracket 68 may be seen to be a sacrificial or interchangeable component that may be replaced as it is damaged in lieu of the underlying components due to wear and tear, or interchanged needed in order to providing a different interconnection system with an internal structure, as required.

Figure 4:
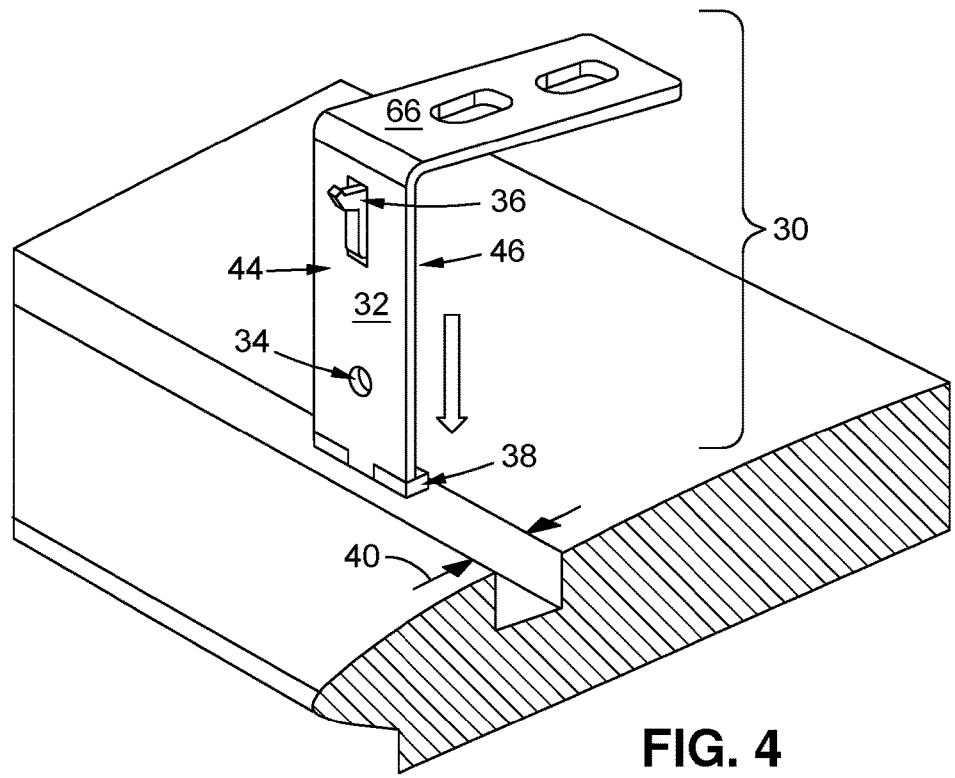
FIG. 4 is a perspective view of an exemplary embodiment of a drip well bracket, showing how it may be engaged with a drip well.

Turning now to FIG. 4, a perspective view of an exemplary embodiment of a drip well bracket 30 is shown along with a drip well 16. As may be seen, the drip well bracket may be installed within the drip well 16 via placement of the drip well occlusion region 38 within the drip well 16. Preferably, the drip well occlusion region 38 is configured to have a thickness of at least half the width 40 of the drip well 16, in order to ensure proper tensioning of the drip well occlusion region 38 against the drip well 16. However, it may be seen that in certain embodiments, which may depend upon the depth at which the drip well portion 32 is configured to be placed within the drip well 16, this may not be necessary in order to ensure fixation when the mounting bracket system 10 is assembled with the vehicle. It may further be noted that the drip well portion 32 has an outer side 44 and an inner side 46, which will be referred to in more detail in relation to further figures which further depict the functionality of the connection of the drip well bracket 30 to the roof rail bracket 20.

It may be seen that the upper drip well fastener 36, in the exemplary embodiment, comprises a separately formed structure that is fixed within a slot on the drip well portion 32. In the exemplary embodiment, the upper drip well fastener 36 is fixed via a permanent method of fixation to the drip well portion 32, in particularly by being welded within the slot. However, it may be seen that in other embodiments, the upper drip well fastener 36 may be permanent fixed in other fashions, including by being formed integrally with the drip well portion 32 rather that independently fabricated and subsequently attached thereto, or may be only temporarily attached, such as via insertion within the slot and retained in position via tension or other form of connection with the upper flange connector 28

It may further be seen that the lower drip well aperture 34 may, in the exemplary embodiment, be a simple aperture for substantial alignment with the lower flange aperture 26 and subsequent placement of the lower aperture fastener 42. However, other arrangements are possible, and the lower drip well aperture may be configured in other ways so as to permit such alignment with and subsequent placement of lower aperture fastener 42 such as by being threated or otherwise contributing to the placement and/or operation of the lower aperture fastener 42.

Figures 5, 6:
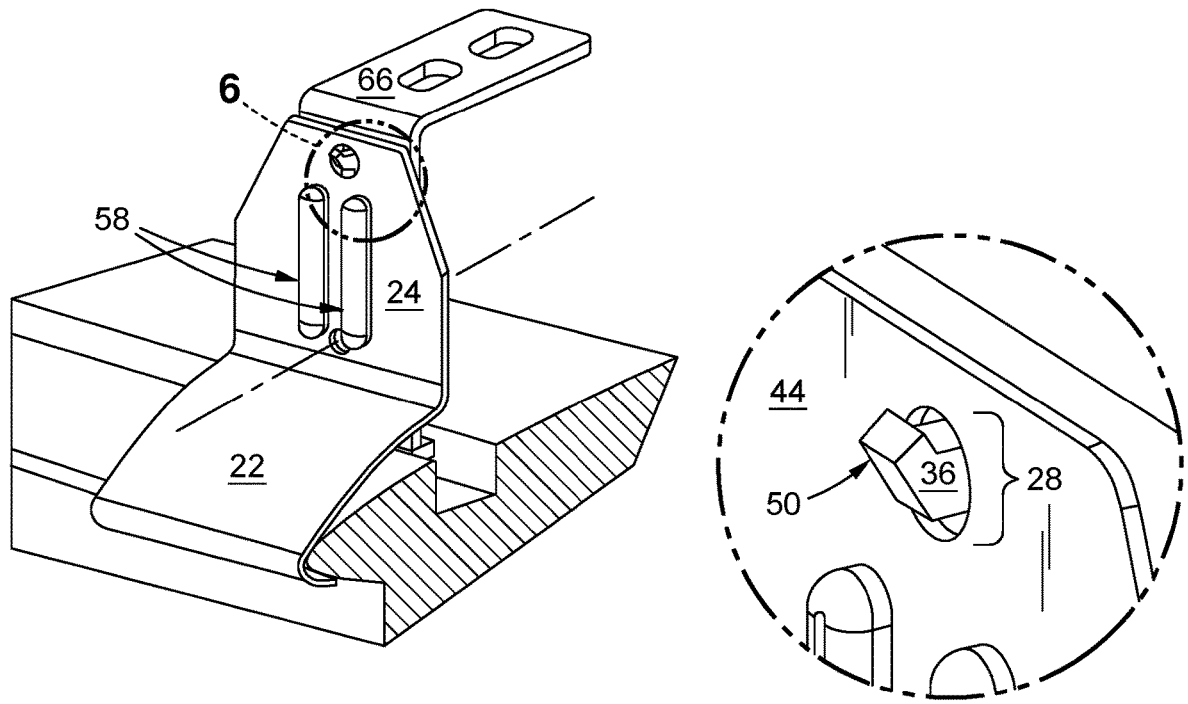
FIG. 5 is a perspective view of an exemplary embodiment of a roof rail bracket and a drip well bracket, showing how the two components may be interconnected together.
FIG. 6 is a magnified view showing of one portion of the interconnection between the roof rail bracket and the drip well bracket shown in FIG. 5.

Turning now to FIG. 5, further aspects of the interconnection between the roof rail bracket 20 and the drip well bracket 30 are illustrated, including the interconnection, in the exemplary embodiment, between the upper flange connector and the upper drip well fastener. Likewise, it may also be seen how reinforcement portions 58, which in the exemplary embodiment may be one or more ribbed portions, may serve to provide additional strength or stiffness, or to otherwise reinforce or otherwise configure or modify the physical characteristics or behavior of the flange portion 24, especially when it is tensioned against the drip well portion 32 of the drip well bracket 30 via the operation of the lower aperture fastener.

Turning now to FIG. 6, a detailed view of the interconnection between the upper flange connector 28 of the flange portion 24 and the upper drip well fastener 36 of the drip well portion 32 is shown. In particular, it may be seen that in the exemplary embodiment, the upper drip well fastener may include a clasp 50 which extends through the upper flange connector 28, which in the exemplary embodiment is a simple circular aperture. As such, it may be seen that when tension may be applied between the lower flange aperture and the lower drip well aperture via operation of the lower aperture fastener, a corresponding pivoting of the either the flange portion 24 and/or the drip well portion 32 in the opposite direction of the applied tension may result, and such pivoting may be restrained by contact between the clasp 50 and the outer side 44 of the flange portion 24 so as to only permit the components to pivot a given distance away from one another. Such pivoting action may be seen to result in further engagement of the drip well occlusion region 38 against the sides of the drip well portion 16, thus enhancing the overall fixation of the mounting bracket system 10 to the vehicle.

Figure 7:
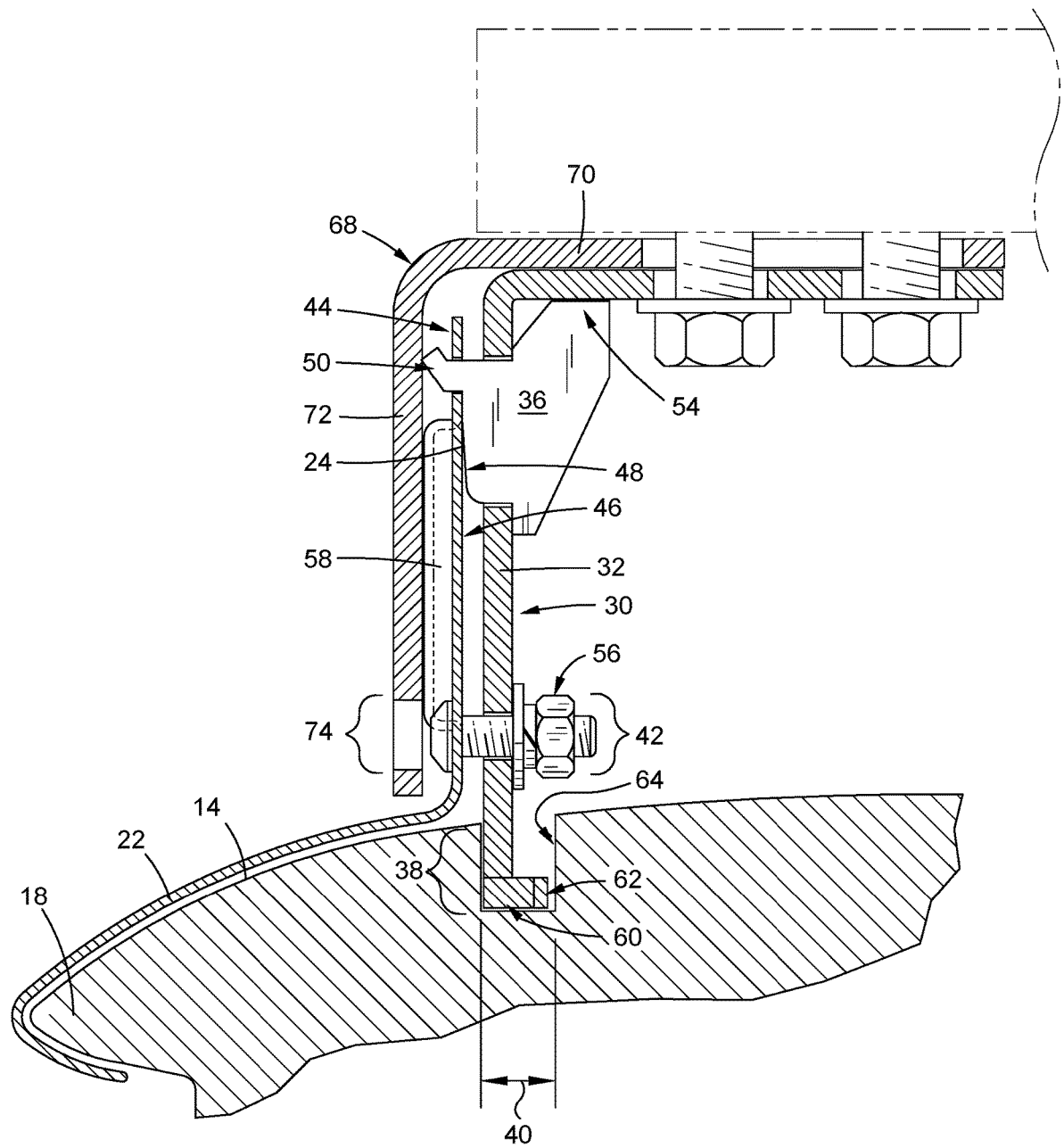
FIG. 7 is a side view of a fully assembled exemplary embodiment of a mounting bracket system attached to a vehicle roof.

Turning now to FIG. 7, a detailed cutaway side view of an exemplary embodiment of a fully assembled mounting bracket system 10 is shown. In particular, it may be seen via this illustration how the interaction between the drip well bracket 30 and the roof rail bracket 20 via operation of the lower aperture fastener 42 to apply tension there between may be seen to anchor the mounting bracket system 10 within the drip well 16. In particular, it may be seen that there may be present a tensioning surface 48 which is configured to protrude towards the inner side 46 of the flange portion 24 and to contact thereupon, which may result in a corresponding pivoting motion of the roof rail bracket 20 and the drip well bracket 30 which may assist in providing a more durable fixation of the mounting bracket system 10 to the vehicle roof, such pivoting being constrained by the functioning of the upper drip well fastener with the upper flange connector, which in the exemplary embodiment is represented by the clasp 50 impinging upon the outer side 44.

In the exemplary embodiment, the tensioning surface 48 may be formed as a part of the same separately formed component that is used to form the upper drip well fastener 36, which may assist in efficient manufacture. However, this is not necessary, and the two components, to the extent that they are present, may be independent from one another. Likewise, a reinforcing armature 54 may be included as well, either independently from any other component or as a further inclusion within an existing component, such as in the exemplary embodiment, where the upper drip well fastener 36 is initially integrally formed separately from the drip well portion 32 and is subsequently welded into a slot therein, and may be seen to include a reinforcing armature 54 atop to provide further strength and weight-bearing capability for the mounting portion 66.

As may be further seen, the drip well protrusion 60 of the drip well occlusion region may be further equipped with a buffer portion 62 which is configured to contact against an internal side of the drip well 16 when the drip well bracket may pivot due to the aforementioned application of forces. By including a buffer portion 62, which in the exemplary embodiment may be a rubberized or plastic portion, the overall force applies to the internal side of the drip well 16 may be spread over a larger area due to deformation of the buffer portion 62, which may prevent unintended damage to the drip well 16. In the same vein, by the buffer portion 62 being formed of a plastic or a rubberized material, the material will not be as hard as the materials of the remainder of the drip well bracket 30, which generally will be a metal, and thus damage to the drip well 16 may be additionally prevented. Likewise, by being formed of a plastic or a rubberized material, the buffer portion may be configured to have a greater coefficient of friction than the remainder of the material of the drip well bracket 30, and thus may be seen to be more securely fixed within the drip well when contacted against the internal surface 64.

The threaded fastener assembly 42 may be seen, in the exemplary embodying, to be a simple nut and bolt arrangement, optionally including a washer, whereby by actuation of the nut and bolt together, tension may be applied between the roof rail bracket 20 and the drip well bracket 30 to bring the two components together in proximity to the lower flange aperture 26 and the lower drip well fastener 36. However, it may be seen that any known or future developed system which may be suitable to apply tension between the aforementioned components at this location may be suitable for use, and that the nut and bolt system illustrated the exemplary embodiment is certainly not the only way in which the lower aperture fastener may be embodied or operated. Many other types of fasteners or fastening arrangements may be used which may achieve a similar or identical functionality, without departing from the scope or spirit of this disclosure, including fasteners or fastening arrangements which may be operative merely using the unadorned apertures as depicted in the exemplary embodiments to apply tension therebetween, or which may be operative using more particular apertures, such as threaded apertures, which may eliminate the requirement for the presence of a nut, if a bolt were to be used. Likewise, the fastener may be captive within one of the lower flange aperture or the lower drip well aperture, and in certain contemplated embodiments, either of these apertures, though termed apertures, need not actually be apertures. For example, a fixed protruding bolt from the location at which one or the other aperture is positioned in the exemplary embodiment may serve to sufficiently tension the two components via the placement of a nut on the other end and tightening of the nut alone. It may thus be seen that there are a multiplicity of options for providing a lower aperture fastener 42 and for providing for its operability in the way in which it is described to function herein, and that many of those options may suffice for the purposes of this disclosure.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. A mounting bracket system for a vehicle roof having a side rail including a drip well and a peripheral edge region having an upper side and a lower side, the mounting bracket system comprising:
   a roof rail bracket, the roof rail bracket comprising a hook portion and a flange portion, the hook portion being configured to engage with the side rail via the hook portion extending downward around the peripheral edge region from the upper side to the lower side, the flange portion defining a lower flange aperture and including an upper flange connector;
   a drip well bracket, the drip well bracket comprising a drip well portion and a mounting portion, the drip well portion defining a lower drip well aperture and comprising an upper drip well fastener configured to engage with the upper flange connector as well as a drip well occlusion region configured for insertion within the drip well, the drip well occlusion region having a thickness sufficient to substantially occupy the majority of a width of the drip well, the drip well portion being configured for engagement with the drip well via insertion of the drip well occlusion region into the drip well; and
   a lower aperture fastener;
   wherein when the hook portion is engaged with the side rail, the drip well portion is engaged with the drip will, and the upper drip well fastener is engaged with the upper flange connector, the lower flange aperture and the lower drip well aperture are configured to be in substantial alignment so as to permit the placement of a lower aperture fastener therethrough, the lower aperture fastener being operative to tension the roof rail bracket against the drip well bracket so as to fix the mounting bracket system to the side rail.

2. The mounting bracket system of claim 1, wherein the flange portion is configured to extend substantially vertically upward when the hook portion is engaged with the side rail.

3. The mounting bracket system of claim 1, wherein the drip well portion is configured to extend substantially vertically upward when the drip well portion is engaged with the drip well.

4. The mounting bracket system of claim 1, wherein the flange portion comprises an outer side and an inner side, and wherein the drip well bracket further comprises a protruding tensioning surface, such that when the upper drip well fastener is engaged with the upper flange connector and when the lower aperture fastener tensions the roof rail bracket against the drip well bracket, the inner side of the flange contacts against the protruding tensioning surface.

5. The mounting bracket system of claim 4, wherein the upper drip well fastener comprises a clasp and the upper flange connector defines an upper flange aperture sized and configured for receiving the clasp therethrough, such that when the upper drip well fastener is engaged with the upper flange connector, the clasp protrudes through the upper flange aperture and contacts against the outer side of the flange when the lower aperture fastener tensions the roof rail bracket against the drip well bracket and the inner side of the flange contacts against the protruding tensioning surface.

6. The mounting bracket system of claim 4, wherein the upper drip well fastener is positioned vertically above the protruding tensioning surface.

7. The mounting bracket system of claim 4, wherein the upper drip well fastener and the tensioning surface are formed as a unitary component for integration with the drip well bracket.

8. The mounting bracket system of claim 7, wherein the integration with the drip well bracket comprises permanent engagement with the drip well bracket.

9. The mounting bracket system of claim 7, wherein the integration with the drip well bracket comprises temporary engagement with the drip well bracket.

10. The mounting bracket system of claim 1, further comprising a reinforcing armature between the drip well portion and the mounting portion for providing additional structural support to the mounting portion.

11. The mounting bracket system of claim 10, wherein the upper drip well fastener, the tensioning surface, and the reinforcing armature are formed as a unitary component for integration with the drip well bracket.

12. The mounting bracket system of claim 1, wherein the lower aperture fastener comprises a threaded fastener assembly.

13. The mounting bracket system of claim 1, wherein the flange portion further comprises one or more reinforcement portions.

14. The mounting bracket system of claim 13, wherein the one or more reinforcement portions comprises at least one reinforcement rib.

15. The mounting bracket system of claim 1, wherein the drip well occlusion region comprises a drip well protrusion substantially transverse to the drip well portion.

16. The mounting bracket system of claim 15, wherein the drip well protrusion comprises a buffer portion for contacting against an internal side of the drip well, the buffer portion being formed of one or more materials having a greater elasticity or a greater plasticity than one or more of the remainder of the materials from which the drip well bracket is formed.

17. The mounting bracket system of claim 1, wherein the mounting portion of the drip well bracket is configured to be substantially transverse to the drip well portion.

18. The mounting bracket system of claim 1, further comprising a cover bracket, the cover bracket comprising a horizontal cover portion and a vertical cover portion, the horizontal cover portion being configured to engage with the mounting portion of the drip well bracket, the vertical cover portion being configured such that, when the horizontal cover portion is engaged with the mounting portion, the vertical cover portion is substantially parallel with and in front of at least a portion of an outer side of the drip well portion.

19. The mounting bracket system of claim 18, wherein the vertical cover portion further defines an adjustment aperture for permitting a user to access and to adjust to the lower aperture fastener.

20. A method for installing a mounting bracket system for a vehicle roof having a side rail including a drip well and a peripheral edge region, the method comprising the steps of:
   providing a mounting bracket system comprising:
      a roof rail bracket, the roof rail bracket comprising a hook portion and a flange portion, the hook portion being configured to engage with the side rail via the hook portion extending downward around the peripheral edge region from the upper side to the lower side, the flange portion defining a lower flange aperture and comprising an upper flange connector;
      a drip well bracket, the drip well bracket comprising a drip well portion and a mounting portion, the drip well portion defining a lower drip well aperture and comprising an upper drip well fastener configured to engage with the upper flange connector as well as a drip well occlusion region configured for insertion within the drip well, the drip well occlusion region having a thickness sufficient to substantially occupy the majority of the width of the drip well, the drip well portion being configured for engagement with the drip well via insertion of the drip well occlusion region into the drip well; and
      a lower aperture fastener;
   wherein when the hook portion is engaged with the side rail, the drip well portion is engaged with the drip will, and the upper drip well fastener is engaged with the upper flange connector, the lower flange aperture and the lower drip well aperture are configured to be in substantial alignment so as to permit the placement of a lower aperture fastener therethrough, the lower aperture fastener being operative to tension the roof rail bracket against the drip well bracket so as to fix the mounting bracket system to the side rail;
   engaging the hook portion with the side rail;
   engaging the drip well portion with the drip well;
   placing the lower aperture fastener through the lower flange aperture and the lower drip well aperture; and
   operating the lower aperture fastener in order to tension the roof rail bracket against the drip rail bracket so as to fix the mounting bracket system to the side rail.

\* \* \* \* \*